United States Patent
Colaiace et al.

[11] 3,817,601
[45] June 18, 1974

[54] ZOOM LENS MOUNT

[75] Inventors: Victor Vincent Colaiace; Melville Wallace Miller, both of Rochester, N.Y.

[73] Assignee: Eastman Kodak Company, Rochester, N.Y.

[22] Filed: May 2, 1973

[21] Appl. No.: 356,700

[52] U.S. Cl. .................... 350/187, 95/45, 350/255
[51] Int. Cl. ............................................. G02b 7/10
[58] Field of Search ...................... 350/187, 44, 255

[56] References Cited
UNITED STATES PATENTS
3,090,282  5/1963  Angenieux .......................... 350/255
FOREIGN PATENTS OR APPLICATIONS
1,285,288  12/1968  Germany .............................. 350/187

*Primary Examiner*—John K. Corbin
*Attorney, Agent, or Firm*—Robert F. Brothers

[57] ABSTRACT

A zoom lens mount includes three nested, concentric barrels with an improved inner barrel for mounting and transporting a component of the lens. The inner barrel comprises a body section having integrally formed resilient members with a cam follower formed on each resilient member. When the three barrels are assembled, each of the resilient members urges its associated follower through a longitudinal slot in a central barrel into a helical cam groove in an outer barrel. Axial movement of the inner barrel is caused by relative rotational movement of the central and outer barrels.

4 Claims, 5 Drawing Figures

PATENTED JUN 18 1974

ZOOM LENS MOUNT

BACKGROUND OF THE INVENTION

1. Field of the Invention

The present invention relates to a variable focal length lens mount and, more particularly, to the mounting of a movable component in a so-called "zoom" lens to permit varying of the focal length of the lens.

2. Description of the Prior Art

A zoom lens comprises a plurality of axially spaced lens components, of which at least one is displacable axially with respect to the others according to a predetermined relationship to vary the focal length of the lens. It is therefore necessary to provide a mount which will provide for the displacement of at least one of the optical components. One mechanism which provides for such displacement is disclosed in German Pat. No. 1,285,288 which provides three helical guide threads in a lens barrel, with mating projections on a lens mount having multiple screw threads extending through slits in a drive sleeve to ride in the guide threads and cause movement of the lens mount. Such a mechanism is relatively costly to manufacture because of the tolerances which must be maintained during forming of the guide threads and multiple screw threads. Simpler photographic apparatus for providing zoom movement, such as in U.S. Pat. Nos. 2,407,511 and 1,649,646, incorporate detents which are spring biased into mating grooves in the movable lens mount thereby insuring contact at three spaced positions about the periphery of the barrel. However, such mechanisms are susceptible to tilting of the lens barrel during operation.

SUMMARY OF THE INVENTION

It is an object of the present invention to provide a new and improved mount for a movable component in a zoom lens.

It is a further object of the present invention to provide such an improved mount which is easily manufactured and assembled.

These and other objects are provided for by the present invention in a zoom mount which includes three nested, concentric barrels with a movable inner barrel for holding and transporting a zooming component. The inner barrel comprises a body having integrally formed resilient members, with a cam follower formed on each resilient member. When the three barrels are assembled, each resilient member urges its associated follower through a slot in a central barrel into a helical cam groove in an outer lens barrel. Relative rotational movement of the central and outer lens barrels is transmitted by means of the cam grooves and followers to the resilient members of the inner barrel, which is then transported in an axial direction with respect to the other components of the zoom lens.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Because photographic apparatus is well known, the present description will be of mechanisms associated with the present invention, with the understanding that structural elements not particularly described or shown may be selected from those known in the art.

Figure 1:
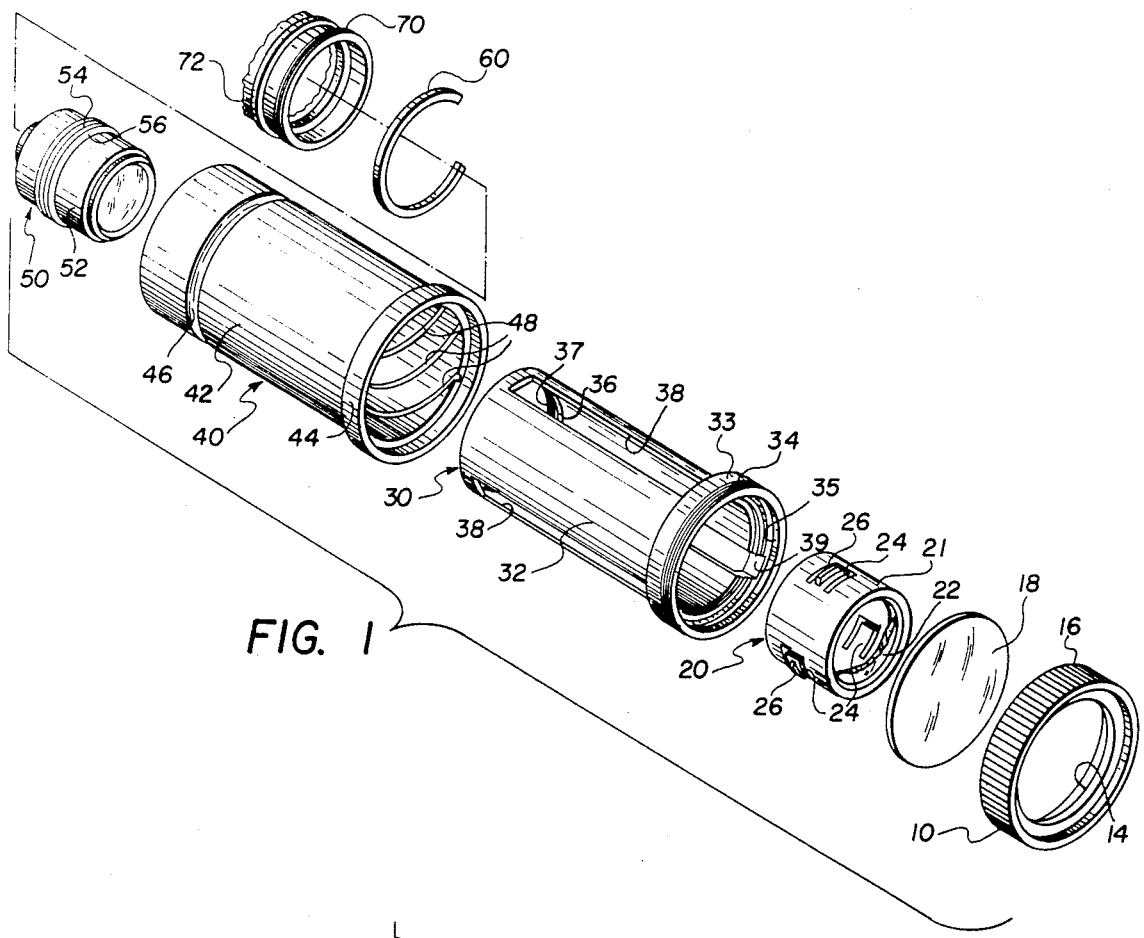
FIG. 1 is an exploded view of the elements of a zoom lens mount according to the present invention.

Referring now to FIG. 1, an exploded mount for a zoom lens is illustrated which includes a front cap 10, a front lens element or component 18, a movable barrel shown generally as 20, a central barrel shown generally as 30, an outer barrel shown generally as 40, a rear lens mount shown generally as 50, a resilient spacer 60 and a rear screw assembly 70 having a mounting lip 72.

Front cap 10 comprises an inner screw portion 12, a lens mounting seat 14 against which element 18 is seated during assembly of the zoom lens and an outer lip 16.

Movable barrel 20 comprises a generally cylindrical body 21 in which a lens element 22 or component may be mounted. Integrally formed with body 21 are a plurality of resilient members 24, each including an integral cam follower 26 extending outwardly from body 21. Each of resilient members 24 is raised slightly with respect to the outer surface of body 21 and will be compressed slightly during assembly of the zoom lens as will be more fully described hereinafter.

Central barrel 30 comprises a generally cylindrical body 32 which terminates in a front flange 33 having an outer front screw portion 34 and an inner ramped lens mounting portion 35. Body 32 is further formed with a rear mounting lip 36, a rear screw portion 37 and a plurality of slots 38 which extend longitudinally along body 32 and which extend through ramped portion 35 as a groove 39. Slots 38 and grooves 39 in body 32 will correspond in number and orientation to the number and orientation of resilient members 24 on body 21, being preferably three in number as illustrated.

Outer lens barrel 40 comprises a generally cylindrical body 42 which terminates in a front flange 44, and includes a mounting groove 46 formed in its outer periphery and a rear mounting flange 47. A plurality of helical cam grooves 48 are formed in the interior surface of body 42, which correspond in number and orientation to slots 38 and resilient members 24, being preferably three in number.

A rear lens mount 50 comprises a generally cylindrical body 52, a screw portion 54 and a mounting lip 56. Mount 50 may include one or more lens elements as may be seen in FIG. 2.

For assembly, resilient members 24 on barrel 20 are compressed and inserted through grooves 39 in central barrel 30 so as to mate with slots 38. Resilient members 24 will then expand slightly and thus releasably hold barrel 20 within barrel 30 with followers 26 extending through slots 38, as may best be seen in FIG. 2. Front lens element 18 is now mounted on mounting portion 35 of central barrel 30 and cap 10 is screwed into position by mating screw portions 12 and 34 so that mounting seat 14 holds lens element 18 against portion 35.

Figure 2:
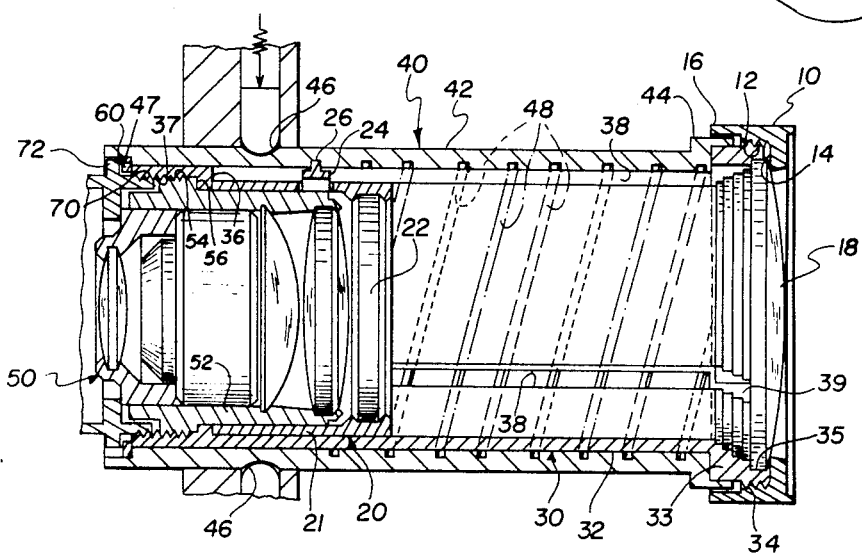
FIG. 2 is a cross-sectional view of the zoom mount of FIG. 1 when assembled and mated with suitable photographic apparatus.

Central barrel 30 and rear lens mount 50 are inserted into the interior of outer barrel 40 from opposite ends, with resilient members 24 again compressed so that cam followers 26 can be mated with cam grooves 48. Front flange 44 mates with outer lip 16 and screw portion 54 on rear mount 50 is threaded into rear screw portion 37 on central barrel 30. Assembly is completed by inserting resilient spacer 60 into the interior of outer barrel 40 against rear mounting flange 47. Rear screw assembly 70 is threaded into rear screw portion 37 of central barrel 30 until it engages spacer 60 with lip 72, holding the zoom lens together. The assembled zoom lens may now be coupled to photographic apparatus which is adapted to utilize it. One such method is illustrated in FIG. 2 in which a spring biased detent is engaged with mounting groove 46 in outer barrel 40. This method is shown for illustrative purposes only and mating of the zoom lens with photographic apparatus may be achieved by any method which is known in the art.

During operation of the zoom lens, it will be seen that front element 18 and the elements mounted in rear mount 50 will remain axially stationary. As outer barrel 40 is rotated relative to central barrel 30, the interaction between cam grooves 48, slots 38 and cam followers 26 will cause barrel 20 to move in an axial direction. Such motion will cause axial movement of lens element 22 with respect to the other elements of the zoom lens thereby achieving the changing focal length which is desired in a zoom lens. The limits of the movement of barrel 20 are determined by the length of slots 38 with the relative speed depending upon the pitch of grooves 48.

Figure 4:
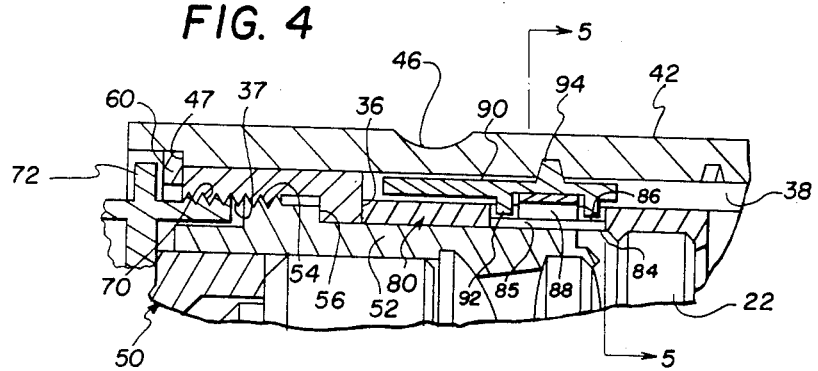
FIG. 4 is an enlarged view of a portion of a zoom lens mount incorporating the movable barrel of FIG. 3.
Figure 3:
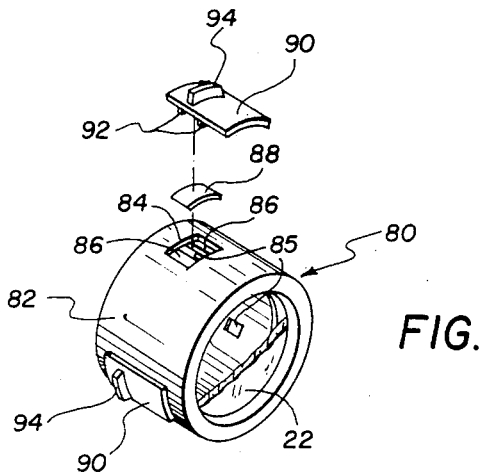
FIG. 3 is an exploded view of an alternate embodiment of the movable barrel of the present invention.
Figure 5:
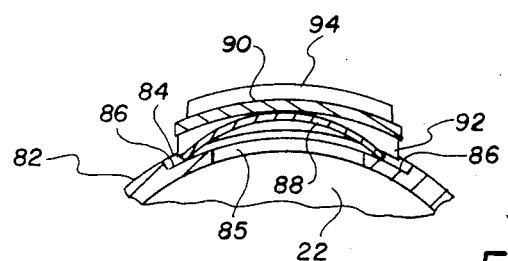
FIG. 5 is a view along the line 5—5 of FIG. 4.

FIGS. 3, 4 and 5 illustrate a modified form of movable barrel 80. Barrel 80 comprises a generally cylindrical body 82 in which zooming lens element 22 may be mounted. Body 82 further has formed in it a generally rectangular shaped slot 84, defining a central opening 85 and a pair of surfaces 86. A curved leaf spring 88 is provided which is adapted to rest upon surfaces 86. Further, a follower element 90 is provided with a pair of flanges 92 and a cam follower 94. Flanges 92 are insertable into slot 84 with spring 88 trapped therebetween. Cam follower 94 is adapted to mate with a groove 48 in outer barrel 40. Assembly of barrel 80 into the zoom lens of FIG. 1 is similar to that described hereinbefore. Follower element 90 is positioned over slot 84 and leaf spring 88 is entrapped between flanges 92. During assembly, leaf spring 88 is compressed slightly and cam follower 94 is passed through slot 39 into groove 48 within outer barrel 40. In a similar fashion to that already described, relative movement of central barrel 30 and outer barrel 40 will cause axial movement of lens element 22 because of the cam action between groove 48 and follower 94.

In either embodiment of the present invention, as described above, the use of a resilient member 24 or spring 88 to urge the cam followers into engagement with cam grooves 48 insures the camming action required to move inner barrel 20 in response to relative rotational movement of central barrel 30 and outer barrel 40. In both embodiments, the body of the inner barrel is dimensioned to provide a close fit with the inner surface of central barrel 30. A close fit prevents tilting of element 22 as it is axially moved and thus insures optical alignment of all of the elements of the zoom lens.

The invention has been described in detail with particular reference to a preferred embodiment thereof, but it will be understood that variations and modifications can be effected within the spirit and scope of the invention.

We claim:

1. A mount for a variable focal length objective comprising a first, second and third barrel, said barrels being nested and concentric and further being relatively movable, said first barrel comprising a plurality of helically progressing cam grooves formed on its surface, said second barrel comprising a plurality of axially extending guide slots and said third barrel comprising a plurality of integrally formed resilient members, each of said resilient members having a cam follower integrally formed thereon and each of said cam followers being urged by its associated resilient member to extend through one of said guide slots into one of said cam grooves to cause axial movement of one of said barrels in response to relative rotational movement of the other two barrels.

2. A mount as in claim 1, wherein said first barrel has three cam grooves, said second barrel has three guide slots and said third barrel has three resilient members, each having one cam follower formed thereon.

3. A mount for a variable focal length objective comprising an outer barrel, a central barrel and an inner barrel, said barrels being nested and concentric and further being relatively movable, said outer barrel having three helically progressing cam grooves formed on its inner surface, said central barrel comprising three axially extending guide slots, and said inner barrel comprising means for mounting a lens element and three integrally formed resilient members, each of said resilient members including an integrally formed cam follower and each of said followers being biased by its associated resilient member to extend through one of said guide slots into one of said cam grooves to cause axial movement of said inner barrel in response to relative rotational movement of said central and outer barrels.

4. In a zoom lens mount which includes an outer barrel having at least three helical cam grooves, a central barrel having at least three axially extending guide slots, a movable inner barrel having means for mounting a lens element, and wherein said barrels are nested and concentric and are relatively movable, the improvement comprising at least three resilient members integrally formed with said inner barrel, each of said resilient members having a cam follower integrally formed thereon and each of said resilient members urging its associated cam follower through one of said slots into engagement with one of said cam grooves to cause axial movement of said inner barrel in response to relative rotational movement of said central and outer barrels.

* * * * *